No. 720,453. PATENTED FEB. 10, 1903.
E. MARSALIS.
PLOW ATTACHMENT.
APPLICATION FILED AUG. 15, 1902.
NO MODEL.
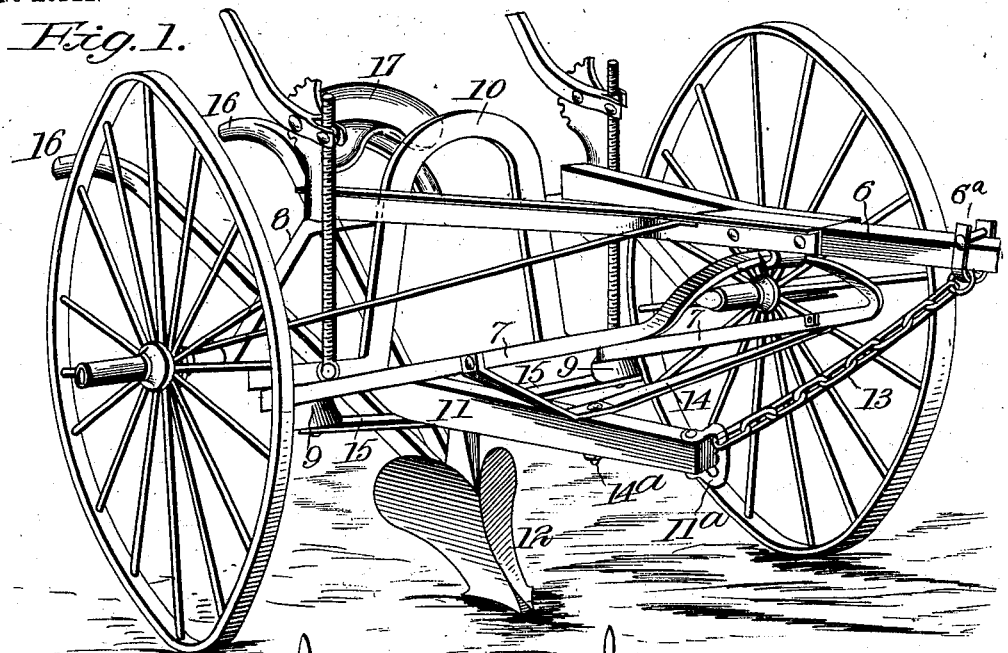
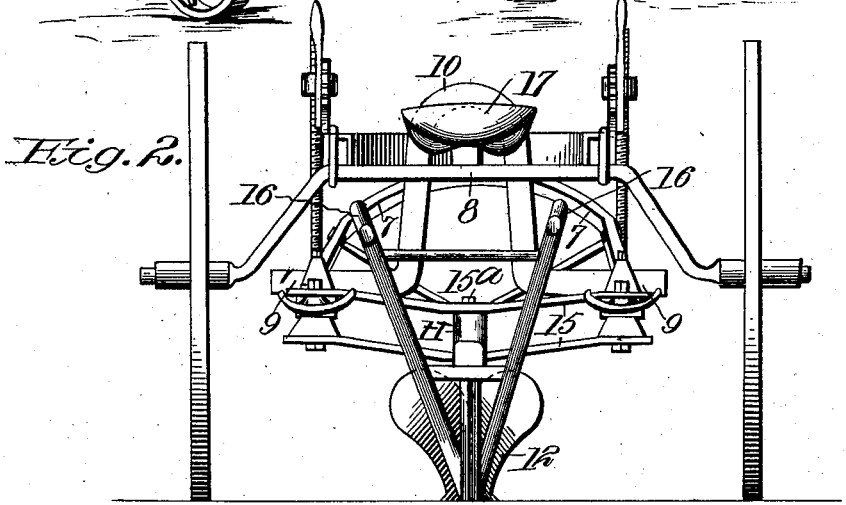
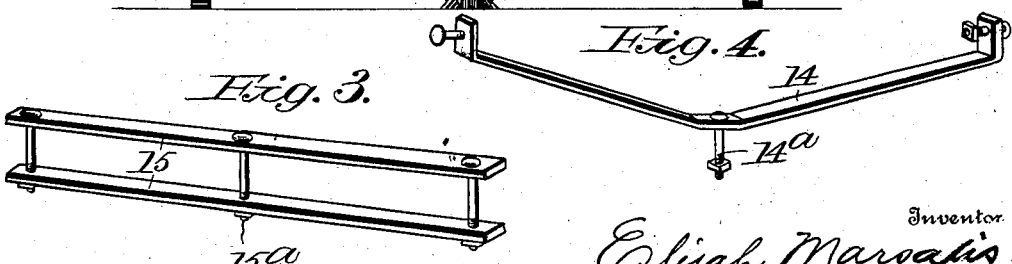
Witnesses
Inventor
Elijah Marsalis
By Milo B. Stevens & Co.
Attorneys

UNITED STATES PATENT OFFICE.

ELIJAH MARSALIS, OF SMITHDALE, MISSISSIPPI.

PLOW ATTACHMENT.

SPECIFICATION forming part of Letters Patent No. 720,453, dated February 10, 1903.

Application filed August 15, 1902. Serial No. 119,798. (No model.)

*To all whom it may concern:*

Be it known that I, ELIJAH MARSALIS, a citizen of the United States, residing at Smithdale, in the county of Amite and State of Mississippi, have invented certain new and useful Improvements in Plow Attachments; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises an attachment whereby an ordinary walking-plow may be attached to the frame of a wheeled straddle-row cultivator of known or old construction.

The object of the invention is to provide means whereby such a cultivator-frame can be used to support an ordinary plow, so that with a wheeled cultivator and a walking-plow the farmer can combine the two to form a riding-plow.

In the accompanying drawings, Figure 1 is a front perspective view of a wooden-beam plow attached to a cultivator-frame by my invention. Fig. 2 is a rear elevation thereof. Figs. 3 and 4 are perspective views of the parts invented by me detached.

The drawings illustrate a straddle-row-cultivator frame of known construction, and to attach a plow thereto the gangs of cultivator-teeth are first removed from their beams. The plow is then attached to the frame in manner and by means as follows: The cultivator-tongue is indicated at 6, the hounds at 7, the arched axle at 8, the cultivator-beams at 9, and the arch connecting the beams at 10. The beam of an ordinary wooden-beam plow is indicated at 11 and the share at 12. These parts are all old. The plow is placed under the cultivator-frame and connected to the cultivator-tongue by a chain 13 from the clevis 11ª of the plow-beam to a coupling 6ª at the tongue. A brace 14 is bolted to the hounds and extends across between the same and is bent downwardly toward the middle to give a proper height to the plow-beam, to which it is joined by a bolt 14ª at or near the forward end of the beam. The rear end of the beam, at or about the plow-standard, is supported and braced between a pair of bars 15, to which it is bolted by a long bolt 15ª, extending through the bars and the beam. The outer ends of the bars are bolted to the cultivator-beams 9, and the ordinary plow-handles 16 will extend up beside the seat 17 of the cultivator, in which position they can be grasped by the operator to steady the plow, if necessary. The plow thus connected to the cultivator-frame can be lifted by the lifting-levers of the cultivator-frame in the same manner as when using the cultivators.

It will be seen that the attaching means are very simple and cheap and can be made by any blacksmith. By the use thereof the advantages of a riding-plow are secured by a farmer having a walking-plow and a wheeled cultivator without the expense of buying a wheeled plow. The connections can be made quickly, and a very cheap and efficient attachment is formed for the purpose intended.

For iron-beam plows instead of having the bolts go through the beam the beam may be spanned by straps bolted to the brace and bars.

What I claim as new is—

The combination with a wheeled frame having a tongue, hounds and spaced side beams, of a plow thereunder, a chain connected to the plow-beam and the tongue, a brace extending across between the hounds and supporting the front end of the plow-beam, and a supporting-bar for the rear end of the plow-beam, joined thereto and extending across between said side beams.

In testimony whereof I affix my signature in presence of two witnesses.

ELIJAH MARSALIS.

Witnesses:
  E. W. REID,
  C. L. LAMPTON.